United States Patent Office 3,490,340
Patented Jan. 20, 1970

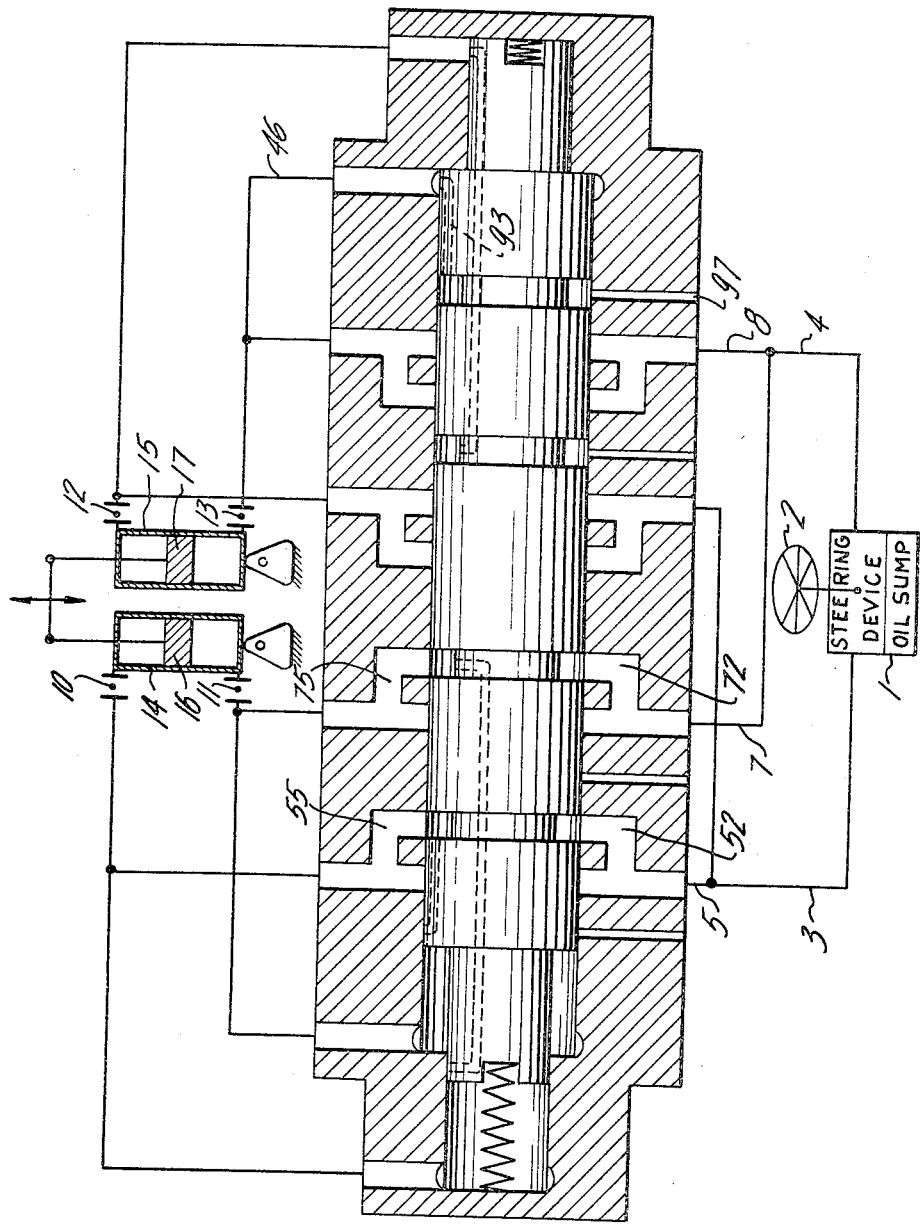

3,490,340
HYDRAULIC STEERING SYSTEM
Hardy K. Skovgaard Pedersen, Augustenborg, Denmark, assignor to Danfoss A/S Nordborg, Denmark, a company of Denmark
Filed Mar. 27, 1968, Ser. No. 716,598
Int. Cl. F15b 11/02, 11/08, 13/04
U.S. Cl. 91—413                                    5 Claims

ABSTRACT OF THE DISCLOSURE

A hydraulic steering system for a vehicle. A steering mechanism effects steering of the vehicle wheels under control of a hydraulic actuating fluid source operable for actuating in parallel two parallel, hydraulic cylinders having reciprocable pistons therein connected to the steering mechanism. The pistons are connected by parallel connections with the hydraulic fluid source. A control slide valve having a spool provided with annular grooves axially spaced thereon controls flow through the parallel paths between the source and the cylinders. The flow paths include hydraulic connections between the cylinders and respective opposite ends of the spool effective to cause displacement of the spool axially in the event of pressure loss to one of the pistons and thereby automatically isolating flow paths to the cylinder in which pressure is lost so that the other piston remains in operation effective for hydraulically operating the steering mechanism. The isolated piston is capable of following in parallel the movements of the hydraulically controlled other piston.

---

Figure 1:
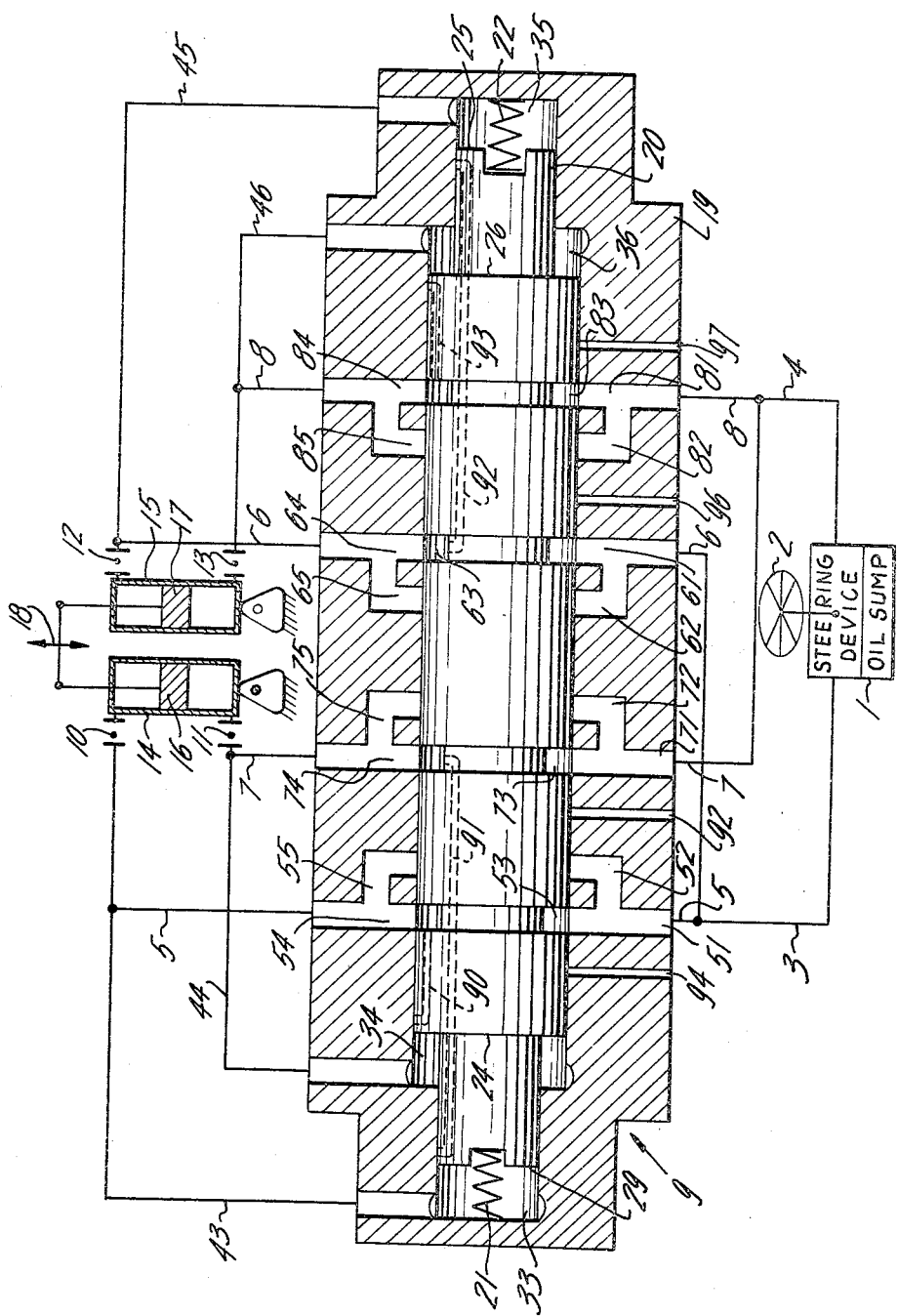

This invention relates generally to vehicle steering systems and more particularly to a new and improved hydraulic steering system for vehicles.

Hydraulic steering systems for the steering wheels of vehicles are known. These systems dispense with the need of mechanical connections between the steering mechanism and the steering wheel. The driving mechanism is connected by hydraulic fluid lines between the driving wheel and the steering mechanisms. Generally the known hydraulic steering systems possess one operating cylinder. When one of the hydraulic connections between it and the steering mechanism ruptures or there is a loss of pressure therein the vehicle can no longer be steered safely. Thus the known hydraulic steering systems are usually used only in slow moving vehicles which can be readily brought to a stop or halt in the event of the loss of pressure in the steering system.

It is a principal object of the present invention to provide a hydraulic steering system which remains operative upon the occurrence of a rupture of one of the parallel lines or connections employed within the system.

Another object is to provide a new and improved hydraulic steering system for use on vehicles which generally are operated rapidly and at relative high speeds.

The hydraulic steering system in accordance with the invention comprises two parallel operating hydraulic cylinders having reciprocable pistons therein which are mechanically connected with the supply or source of the hydraulic fluid. The source itself is operable by the steering wheel of the vehicle for effecting control of the cylinders in parallel through parallel flow paths or connections. Within these paths is provided a control slide valve which is in series with the pistons and is operable in dependence upon loss of pressure in one of the parallel lines, for example in the event of a rupture therein, to isolate the supply lines to the cylinder within which pressure is lost so that the other cylinder remains under pressure and effective to carry out hydraulic steering of the steering mechanism.

Each of the operating cylinders are sufficiently strong to carry out operation alone even though they are generally operated in parallel. The control valve is part of the steering system such that the connecting lines can be connected directly to the control valve instead of to the outlets of the steering system as heretofore. Since the control valve immediately isolates the flow paths or branches thereof in which pressure is lost only the hydraulic fluid in the broken lines and the respective cylinder supplied by the broken lines is lost.

The control valve is provided with portions therein symmetrically arranged axially thereon defining annular grooves that carry out porting between the parallel paths of supply and discharge between the cylinder and the hydraulic fluid source. Connections are provided for biasing the control valve hydraulically in opposite directions so that when a pressure loss is sensed the slide valve moves in one of the other of the two opposite directions and carries out isolation of the parallel cylinders.

Preferably the end faces or actuating surfaces sensing the pressure within the cylinders are of equal area. Moreover, the valve is able to connect the pipes with an air-discharge connection or vents to atmosphere so that the isolated connections are vented to the atmosphere and the piston isolated from the hydraulic fluid source is free to follow the movement of the other piston.

Other features and advantages of the steering system in accordance with the present invention will be better understood as described in the following specification and appended claims, in conjunction with the following drawings in which:

FIG. 1 is a schematic diagram of a steering system provided with a control slide valve in accordance with the invention and illustrates the control valve in longitudinal section in a neutral operative position; and FIG. 2 is a similar schematic view to that of FIG. 1 illustrating the control slide valve of the system in a right hand end operative position.

The hydraulic steering system of the invention comprises a steering device 1 having an oil sump, and control device, diagrammatically shown, operated from a steering wheel 2 and constructed, for example, as described in United States Patent 2,984,215. This device functions as a hydraulic fluid source for operating a steering mechanism as hereinafter explained. The device 1 is provided with outlet connections 3, 4 which are under pressure and function as discharge or return lines depending upon direction of rotation of the wheel 2. The fluid line 3 or connection is divided into two parallel branch lines 5, 6. The line 4 is divided into two parallel branch lines 7, 8. In all of these parallel lines or conduits 5–8 is connected a common control slide valve 9. The four parallel lines, 5–8, are connected in series with the valve and through flexible hose connections, 10–13, to two parallel operating hydraulic cylinders 14, 15 having reciprocable pistons 16, 17 therein which act in common, in parallel, upon a steering rod system or steering mechanism 18 for steering the wheels, not shown, of a vehicle.

The control slide valve 9 comprises a housing 19 within which is disposed an axially symmetrical slide valve element or spool 20 which is biased in opposite directions by springs 21, 22 respectively. The spring 21 is disposed in a recess on an annular end face 23 and the spring 22 is received in a recess in an annular end face 25 of the piston. The effective areas on the piston opposite end faces 21, 22 are equal. The piston is provided with a central axial portion of larger diameter having opposite, annular, pressure faces 24, 26 likewise of equal effective area. Axial projections of lesser diameter having the end faces 23, 25 are shorter than the housing bore within which the spool is disposed so that pressure spaces 33, 35 are formed between the outermost end faces and the inner walls of the housing. The reduced diameter portions and the major diameter central portion define other spaces 34, 36 with the major diameter portion of the bore of the housing 19 as illustrated.

The outermost pressure spaces 33, 35 are connected or in communication with the supply and return lines 5, 6 through branch lines 43, 45 which are likewise in communication with one end of the respective operating cylinders 14, 15. The inner compartments or spaces 34, 36 are in communication with the opposite end of the respective operating cylinders and supply and discharge connections 7, 8 through respective lines or branch connections 44, 46. The valve spool is provided with annular grooves providing communication between the lines and the pressure spaces.

The various lines including the parallel connections or lines are connected through annular grooves disposed axially spaced on the slide valve element 20. The line 5 is connected through an inlet 51 in the housing having a branch passage 52 in communication with the annular groove 53 on the spool 20 which has communication with a discharge outlet 54 in communication with the branch passage 55 in the housing 19. The other lines are similarly connected with the cylinders through annular grooves in the valve element 20. Thus the other lines 6–8 have inlets 61, 71, 81 connected with branches 62, 72, 82 and discharge through annular grooves 63, 73, 83 to outlets 64, 74, 84 and their branch passageways 65, 75, 85 in parallel connection with the operating cylinders. It being understood that the two parallel lines 5, 6 are connected to one end of the respective operating cylinders and the other two lines 7, 8 are connected to the opposite ends of the operating cylinders. Furthermore, the four parallel lines function either as discharge or return lines depending upon the movement of the steering wheel 2.

The slide valve element is provided with air-discharge passages 90–93 which are placed alternatively in communication with two of the discharge lines 43–46 whenever the valve is displaced isolating a broken part of the fluid system. These passages are in position for being placed in communication with vents 94–97 in the housing 19 which vent or discharge to the atmosphere.

In the usual operating position the valve 20 is in a neutral position as illustrated in FIG. 1. For example hydraulic fluid under pressure is fed by means of line 4 and out the branches 7, 8 to one end of the respective operating cylinders to move the pistons upwardly and the discharge from the cylinders is returned through the other parallel lines 5, 6. Equal amounts of hydraulic fluid flow through the supply parallel lines 7, 8 and their respective flexible hose connections 11, 13 into the spaces below the pistons 16, 17 in the two operating cylinders 14 and 15. The oil displaced by the pistons passes through the flexible hose lines 10, 12 and is discharged through the parallel return lines 5, 6 back to the return line 3. Both pistons 16 and 17 together, in parallel, actuate and control the steering rod system 18. The slide 20 is under pressure through the two lines 43, 45 and is maintained in its central and neutral position as illustrated in FIG. 1.

Let it now be assumed that the flexible connection or hose 12 ruptures. Hydraulic fluid flows outwardly therefrom and a pressure drop develops which carries over through the line 45 into the pressure compartment 35. Consequently the pressure in the opposite end compartments 33, 34 on the left hand end of the slide overcome decreased pressure on the right hand of the slide or spool 20 and it moves in a direction toward the right and toward its end terminal position illustrated in FIG. 2.

In this end position the line 5 communicates with the flexible hose 10 by means of the branch passages 52, 55 and the line 7 with the flexible hose 11 by means of the branch passages 72 and 75. The slide valve element 20 has, however, blocked the other parallel lines 6, 8. The cylinder space below the piston 17 in the cylinder 15 is relieved of pressure through the line 46 and the vent passage 93 and line 97. The upper side is relieved of pressure through the rupture in the flexible hose 12. Consequently the piston 17 can be readily moved and follow the movement of the piston 16 when the latter is actuated hydraulically under the control of the steering device 1.

It can readily be seen that corresponding conditions prevail upon rupture of any one of the other flexible hoses or other lines so that emergency steering operation can be carried out in each case.

In order to prevent pressure impacts in the conduits or various lines when the valve 9 changes over to an isolating position the annular grooves in the slide element 20 or the adjoining passages should be sufficiently wide to provide them with beveled edges so that oil flows through the transverse branch passages 52, 72, 55 and 75 before the associated main passage 51, 71, 54 and 74 is blocked or isolated.

What I claim and desire to be secured by Letters Patent is:

1. A hydraulic steering system for steering a vehicle comprising, steering mechanism for steering the vehicle, a pair of parallel operating hydraulic cylinders having pistons reciprocable therein operably connected to said steering mechanism, a source of hydraulic actuating fluid operable for actuating said pistons in parallel, parallel connections between said source and said cylinders comprising a control slide valve in series with said pair of cylinders for automatically isolating the cylinders individually, independently of each other from said source in response to a loss of hydraulic pressure thereto, and bias means biasing the slide valve in opposite directions axially, whereby in the event of loss of fluid pressure to one of said cylinders the other remains effective for use in hydraulically actuating said steering mechanism.

2. A hydraulic steering system for steering a vehicle according to claim 1, in which said slide valve comprises means symmetrically arranged axially thereon for controllably isolating flow of hydraulic fluid in said parallel connections between said cylinders and said source in response to a pressure loss in said one cylinder.

3. A hydraulic steering system for steering a vehicle according to claim 2, in which said slide valve is an elongated valve spool having annular grooves arranged axially spaced thereon for connecting said cylinders and said source in parallel, and in which said bias means comprises connections in said parallel connections comprising connections from said cylinders in communication with opposite respective ends of said spool for causing and effecting longitudinal displacement of said spool in response to a pressure drop in the parallel connections to a pressure drop therein and displacing said annular grooves thereby isolating from said source said one cylinder in which pressure drops.

4. A hydraulic steering system for steering a vehicle according to claim 3, in which said ends of said cylinder each have equal areas.

5. A hydraulic steering system for steering wheels of a vehicle according to claim 1, including hydraulic discharge vents to atmosphere rendered effective when said valve is effectively isolating one of said cylinders to allow the piston in said isolated cylinder to operate freely and follow movement of the other hydraulically operated piston.

References Cited
UNITED STATES PATENTS
3,190,185   6/1965   Rasmussen _____ 91—447

PAUL E. MASLOUSKY, Primary Examiner

U.S. Cl. X.R.

91—445, 468